J. R. Miller.
Submarine Tunnel.
No. 2,504. Reissued Mar. 12, 1867.
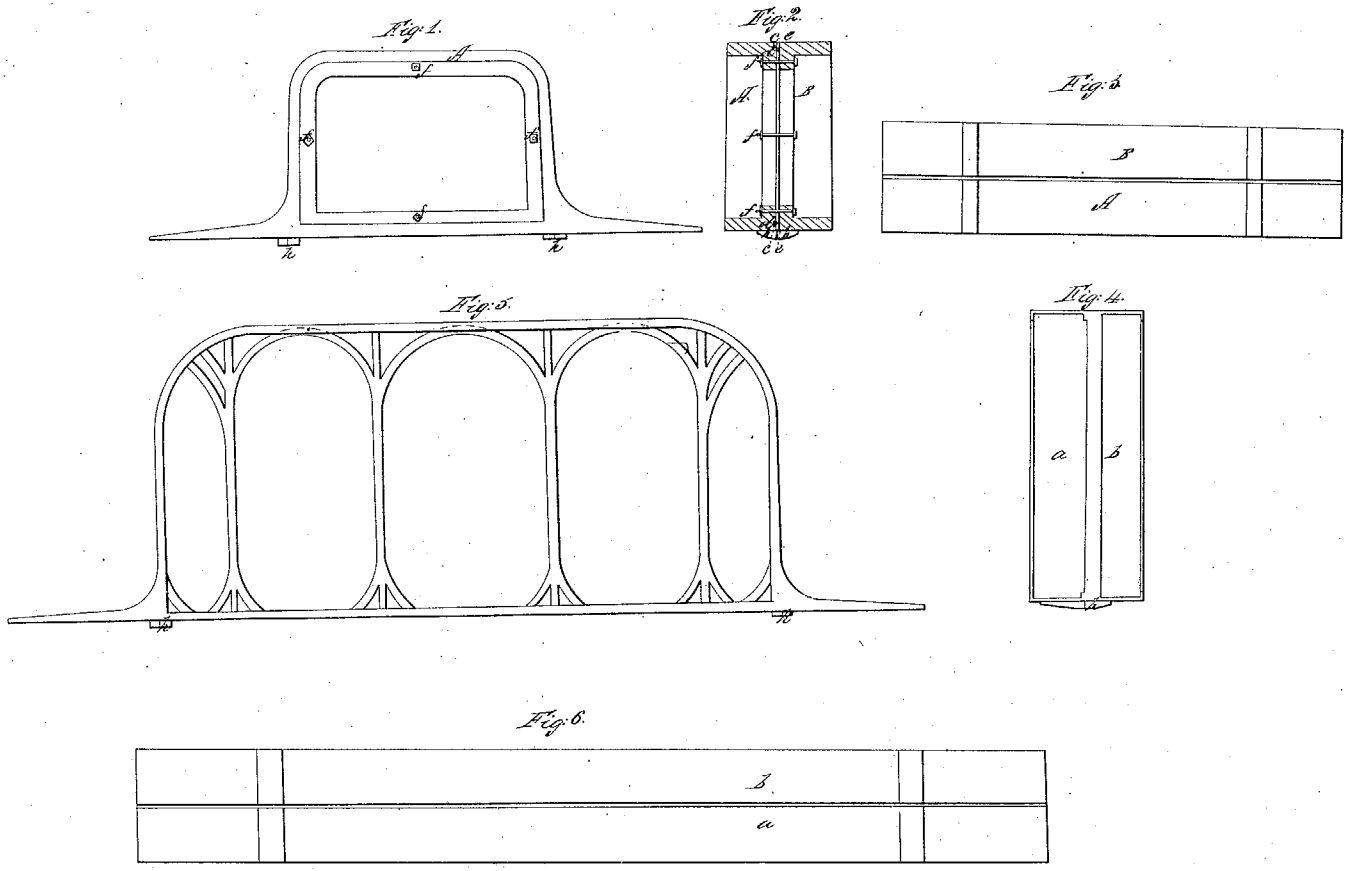
N. PETERS, PHOTO-LITHOGRAPHER, WASHINGTON, D. C.

United States Patent Office.

THE AMERICAN SUBMARINE TUNNEL COMPANY, OF NEW YORK, N. Y., ASSIGNEES OF JOSEPH R. MILLER.

*Letters Patent No.* 9,899, *dated August* 2, 1853; *reissue No.* 2,504, *dated March* 12, 1867.

IMPROVEMENT IN SUBMARINE TUNNELS.

The Schedule referred to in these Letters Patent and making part of the same.

TO ALL WHOM IT MAY CONCERN:

Be it known that JOSEPH R. MILLER, of Jersey City, in the county of Hudson, and State of New Jersey, did invent a new and useful Submarine Avenue or Carriage Way, applicable also to subterranean use, which is described as follows, reference being had to the annexed drawings of the same, making part of this specification.

Figure 1 is a transverse section of the avenue, showing two sections bolted together.

Figure 2 is a longitudinal section of a portion of the road-way.

Figure 3 is a top view.

Figure 4 is a sectional view of a single section.

Figure 5 is a section of another form of avenue.

Figure 6 is a top view of ditto.

Similar letters of reference refer to corresponding parts in the several figures.

The nature of this invention and improvement, as applied to submarine uses, consists in casting a submarine roadway in separate sections, each of a peculiar form, and all of corresponding size and shape, so that when they are placed upon the bed of the river, (previously graded,) and bolted together, and the joints carefully packed, and the whole structure securely anchored by weight of stone or other heavy substance placed upon the horizontal flanges of the sections and the water drawn from the interior by suitable engines, a dry way will be formed beneath the surface of the river from one side to the other, without the trouble, expense, and danger of tunnelling or bridging.

The submarine avenue is constructed principally of cast iron, of dimensions, both in height and width, to suit the purposes for which it may be required. It may be constructed for one or two railways, carriage-ways and footways may be added, or it may be constructed for carriage and footways without the railways. The object of this avenue is to effect crossing through navigable or other water without tunnelling below the bed of the river or interfering with navigation. To effect this the bottom of the river or other water must be graded to a depth sufficient for the superstructure to rest upon, leaving a sufficient depth of water above for the purposes of navigation, and not to reduce the area of water so much as to prevent the necessary flow. The castings must be made in sections A B, each section consisting of one or more pieces, and forming a part of the entire avenue, and may vary in length according to the weight of each lineal foot, and may be made as large as can be conveniently handled. In one end of each section there will be a groove, *c*, which will be partly filled with India-rubber packing, *d*, and on the other end a tongue, *e*, to fit said groove; the sections will then be drawn together by bolts, *f*, through the flanges, which will cause the tongue to press upon the India rubber and make a water-tight joint. In order to form the grades at the end of the avenue, a few sections will be diminished in length from bottom to top, which should be continued until the proper grade is obtained. The whole will be secured permanently in its place by placing a sufficient quantity of stone or other weighty material upon the flanges or wings that extend from the sides resting on the bed of the river. When it is all put together and the water pumped out, the joints may be packed with metallic packing. To facilitate the work of putting the sections together, there will be jogs, *h*, cast on the bottom, as shown in the drawings, of length sufficient to reach from the edge of one section beyond the edge of the adjacent section, to guide the new section and hold the bolt-holes and other corresponding parts opposite to each other until the joints are closed.

It is manifest that this invention is applicable to subterranean as well as to submarine tunnels; but when used under ground it will not, in ordinary cases, be necessary to make the joints perfectly water-tight, nor will it be necessary to anchor the structure down by means of stone or other superincumbent weight.

Having thus described the invention of the said JOSEPH R. MILLER, and the modes of carrying it into effect, what this applicant claims as new, and desires to secure by Letters Patent, is—

The construction, arrangement, and formation of submarine and subterranean avenues, by means of cast-iron sections united together by flanges and bolts, in the manner and for the purpose herein described.

AMERICAN SUBMARINE TUNNEL COMPANY,
By JOHN F. CONREY, *Secretary*.

Witnesses:
JAS. W. HALE,
JNO. C. WENMAN.